United States Patent
Samworth

(10) Patent No.: US 6,310,698 B1
(45) Date of Patent: Oct. 30, 2001

(54) PROCESS FOR CALIBRATING ELECTRONIC IMAGING DEVICES

(75) Inventor: Mark R. Samworth, Wilmington, DE (US)

(73) Assignee: Artwork Systems, Inc., Bristol, PA (US)

( * ) Notice: Subject to any disclaimer, the term of this patent is extended or adjusted under 35 U.S.C. 154(b) by 0 days.

(21) Appl. No.: 09/569,065

(22) Filed: May 10, 2000

(51) Int. Cl.[7] ............................. H04N 1/405; H04N 1/52
(52) U.S. Cl. ........................ 358/1.9; 358/459; 358/406
(58) Field of Search ........................ 358/1.9, 298, 456, 358/459, 460, 406, 534, 504

(56) References Cited

U.S. PATENT DOCUMENTS

| | | | |
|---|---|---|---|
| 5,473,734 | 12/1995 | Maskell et al. | 358/1.9 |
| 5,649,073 | * 7/1997 | Knox et al. | 358/1.9 |
| 5,731,884 | * 3/1998 | Inoue | 358/456 |
| 5,818,960 | 10/1998 | Gregory, Jr. et al. | 382/167 |
| 5,854,882 | * 12/1998 | Wang | 358/1.9 |
| 5,884,013 | 3/1999 | Bosschaerts et al. | 358/1.9 |
| 5,936,741 | 8/1999 | Burns | 358/298 |

* cited by examiner

Primary Examiner—Scott Rogers
(74) Attorney, Agent, or Firm—Ratner & Prestia

(57) ABSTRACT

A method for developing calibration curves and for calibrating a halftone imaging device to reproduce on an imaging medium gray scale values equal to input gray scale values entered in said imaging device. According to this method a calibration function representing a linear change in reproduced halftone dot size on said imaging medium as a function of input halftone dot size is developed by using the device to reproduce on an imaging medium at least two test input dot values representing two different % halftone dot sizes and determining a linear change between the input and the reproduced halftone dot sizes. The dot growth is used to predict dot changes for other % halftone dots and thus construct calibration curves which may be used to calibrate the imaging device.

20 Claims, 2 Drawing Sheets

PROCESS FOR CALIBRATING ELECTRONIC IMAGING DEVICES

BACKGROUND OF THE INVENTION

1. Field of the Invention

This invention relates to calibrating imaging devices to compensate for changes in halftone values during imaging and more particularly to a system for developing a plurality of calibrating curves for such imaging devices using a minimum number of calibrating measurements.

2. Description of the Related Art

Halftone printing and the tools needed in such printing are well known in the art. Halftone printing uses an aggregation of monochromatic dots to produce different shades of gray or other colors. (We will use the term gray scale and black, in describing the present invention, however, as is well understood in the art, the term gray scale designates a series of tonal differences both for black and white as well as color. As used herein, the term black is used to designate a fully exposed area, also referred to as a solid area, while the term white designates a total lack of exposure).

Halftone reproductions rely on the ability of the human eye to integrate a plurality of small black dots on a white background and perceive the dot covered area as a shade of gray. Thus white areas have no dots, or 0% dot coverage, and black areas have 100% dot coverage, that is are fully exposed. Typically the percentage dot coverage of an arbitrarily selected unit area is used to identify its gray level. An area having sufficient dots of sufficient size to cover one half of it is defined as a 50% dot coverage and the dots are 50% dots, and so on.

Two methods are used most often to create the different shades of gray in the gray scale. The first method, known also as AM modulation, and uses black dots of increasing diameters arrayed in a regular matrix along rows and columns at a given frequency, identified as a screen ruling, to create the different gray levels. Screen rulings used in modern day printing typically vary from 50 to 75 lines per inch (LPI) for low quality applications, and from 100 to 200 lines per inch for high quality. What this means is that dots are produced as regular arrays of dots at a centerline pitch of 50/inches or 75/inches. The pitch is often given in micrometers or microns. 50 LPI translates to a distance between adjacent dot centers of 25400 microns/50 or 508 microns. Similarly, a 120 LPI screen ruling places adjacent dot centers at a distance of 196 microns. When the ruling is a 90 degree ruling, each unit area, or cell, containing a single dot has an area of $196^2$ microns$^2$.

Because color is reproduced in halftone reproductions by the superposition of a plurality of monochromatic images of primary colors and therefore by the superposition of arrays of dots, the superposition of different regular arrays of dots can result in Moiré patterns which are unacceptable. This problem has been alleviated by aligning the different dot arrays for each monochromatic array at different angles relative to each other. Thus in the reproduction of a colored image there may be involved as many as four or more superposed monochromatic halftone images having dots generated with four or more different screens.

The second method, known as stochastic halftone or FM modulation, uses one size dots at different concentrations per unit area, randomly dispersed, to obtain the same result.

Modern publishing systems use computer driven imaging devices to produce images on an imaging medium with digital signals produced at computer work-stations using application programs that allow reproduction of text and graphic images. In many applications the imaging medium is photosensitive film, and the imaged film is subsequently used to expose therethrough a material useful for making a printing plate for lithographic, flexographic, or other halftone type printing.

In such systems an image appearing as it is desired for it to appear on a final imaging medium, is first created on a computer and displayed on a monitor. Once a proper composition is satisfactory, the different color separation halftones needed to reproduce the image on an imaging medium are created. In creating the halftone color separations, gray levels, from 0–100%, are assigned to different portions of the image in each color separation. The type of halftone method used, i.e. AM or FM modulation, and the halftone screen grid ruling (frequency) and angle must also be specified prior to the computer image being sent to the imaging device.

This information is used by the computer software to create and locate the necessary dot sizes for each color separation. Each color separation is viewed as a separate image having designated gray scale value areas. In the case of AM modulation given a particular screen ruling, a dot pattern is calculated representing the necessary dot sizes to be used for every image area. Depending on the imaging device configuration, this information is usually provided to the imaging device to control the exposing source as the source is scanned across the imaging medium, turning the source on/off to generate an appropriate size dot pixel by pixel.

In printing industry applications, the imaging device is an image setter for exposing, typically, a high contrast silver halide film to produce a color separation with the requested gray values.

In generating each of the color separations, the value of every halftone dot, and thus the reproduced image, is affected by the optics of the imaging device, by the intensity of exposure given the output media, by the photosensitive characteristics of the output media employed, and by chemical processing conditions. The effects of these so-called image processing variables are different for different materials, processes, gray levels, and for different grid screen rulings.

Calibration methods have been developed to compensate for the effects of these different factors on the final image dots so that the gray levels produced on the output media is equal to the gray levels requested by the computer workstation. As currently practiced, these methods typically require direct measurement of a multitude of output test areas containing different size dots, generated during calibration procedures in which a series of gray values are requested as original input for each of every halftone grid screens used and for each of the different output media used. The data obtained from these measurements are typically preserved in a computer memory as a look up table (LUT) or curves in hard copy format in the form of output dot size as a function of requested, or input dot size. From these values or curves one may work backward to obtain correction values or curves that can be applied to the requested dot sizes before such values are used by the image setter, to modify such dot sizes so that the output dot sizes accurately represent the requested sizes. Hereinafter, the obtained correction values, whether stored as LUT or curves are both referred to as "calibration curves".

Specifically, to determine a calibration curve for a single halftone grid screen, a plurality of requested dot sizes that very from 0% to 100% in predetermined increments are sent to an image setter from a computer, and imaged without modification onto the output media. The output media is developed into a final hard copy generally through chemical processes. The gray scale values produced on the imaging media are measured as a function of requested or input gray scale values to obtain a calibration curve for all values requested. (See FIG. 1, for example) Based on these curves, a request for an output 30% dot size if uncorrected will result in a 10% dot. Thus a correction factor is calculated from the calibration curve II in FIG. 1 in effect changing the requested value from 30% to 55%. Requesting a 55% every time a 30% dot is desired results in producing with the particular imagesetter, screen ruling and imaging medium output dots equal to 30% dots.

The procedure to generate this calibration curve is repeated for each halftone grid screen that might be used and then for each different imaging medium that might be used with a particular imaging device. It is normal to use at least 10 different image input gray levels for each different screen and for each different imaging media during this calibration.

Recently, a method using measurements of two rasters having the same selected gray scale value have been used in an effort to calibrate an imagesetter. See for instance U.S. Pat. No. 5,473,734 issued Dec. 5, 1995 to Maskell et al. In this patent Maskell et al. teach using density change measurements between the reproduced gray scale and the requested gray scale to develop a function that permits estimating the change in area coverage for all gray scale values and thus calibrate the imagesetter.

While the Maskell et al calibration method offers a great advantage over the previous method requiring multiple measurements of multiple density scales, it suffers, however, in one respect. Maskell et al assumes in his calculations that dot change during the dot reproduction will be uniform for all size dots because each dot is constructed by same size pixels. This assumption is only partially correct. Individual pixels forming very small and very large dots do not grow by the same amount but are subject to different growth rates primarily due to the photochemistry of the imaging medium and the fact that multiple adjacent pixels forming larger dots in effect receive longer exposures due to the fact that a laser exposing beam has a gaussian distribution which results in higher exposure levels due to overlap at the junction of adjacent pixels.

Maskel's approach provides a close approximation for predicting dot growth particularly with mid size dots. The method becomes progressively less accurate at the two dot size extremes. In addition implementation of the Maskell method requires a process that is conceptually different from the typical calibration process to which the average printer is familiar, requiring a totally different procedure. It is therefore still desirable to develop a calibration method that is both familiar to the operators of typesetting operators and provides good accuracy for all dot sizes and screens, with a minimum number of exposures and measurements.

SUMMARY OF THE INVENTION

It is an object of the present invention to provide a method for calibrating a halftone imaging device to reproduce on an imaging medium gray scale values equal to input gray scale values entered in said imaging device, the method comprising developing a calibration function representing a linear change in reproduced halftone dot size on said imaging medium as a function of input halftone dot size by using said device to reproduce on an imaging medium at least two test input dot values representing two different % halftone dot sizes and determining a linear change between said input and said reproduced halftone dot sizes.

In somewhat more detail, it is an object of the present invention to provide a method for calibrating a halftone imaging device, the method comprising:
A) requesting said imaging apparatus to produce on an imaging medium at a first screen ruling a requested halftone dot test pattern comprising at least two different requested halftone gray values, each halftone gray value comprising dots having a requested dot diameter and a requested dot area, said gray value representing the portion of a unit cell area covered by the dot area;
B) producing with said imaging apparatus on said imaging medium a imaged test pattern corresponding to said first test pattern;
C) measuring said imaged test pattern dot areas and calculating an imaged dot diameter for each of said distinct imaged dot areas in said imaged test pattern;
D) calculating a dot diameter change as a difference between said requested dot diameter and said imaged dot diameter for each of said different halftone gray values of said requested and second test pattern;
E) deriving a first function representing said calculated dot diameter change as a function of requested dot diameter;
F) using said first function, to predict a predicted dot diameter change for any requested dot diameter;
G) using said predicted dot diameter, calculating a predicted dot area and a predicted dot value representing the proportion of the area of any unit cell covered by the predicted dot area;
H) using a plurality of such predicted dot values as a function of requested dot values to derive a calibration curve for a halftone imaging apparatus.

The calibration curve is, usually, stored in a memory as a Look-Up-Table, and a computer is used to correct each requested dot value using the data in the LUT.

Particularly when the imaging medium is a photopolymer imaging layer, it is advantageous to use a test target that includes two sets of at least two distinct dot values, each set representing dot values at a different screen ruling. In such case, two "first" functions are derived, one for each of the set of dot values and screen ruling. The step of calculating the predicted dot diameter change in this case, further includes the step of deriving by extrapolation from the two "first" functions an extrapolated third "first" function corresponding to a desired screen ruling, and using the extrapolated "first" function in predicting dot growth for a particular screen ruling.

In accordance with this invention there is also provided a method for correcting requested halftone dot values sent to an imaging apparatus for accurate reproduction on an output medium, the method comprising using the calibration curve to alter any requested dot value sent to the imaging equipment to produce on the imaging medium an output value substantially equal to requested value.

DETAILED DESCRIPTION OF THE INVENTION

The invention will next be described with reference to the drawings wherein similar numerals represent similar elements in all figures.

Figure 1:
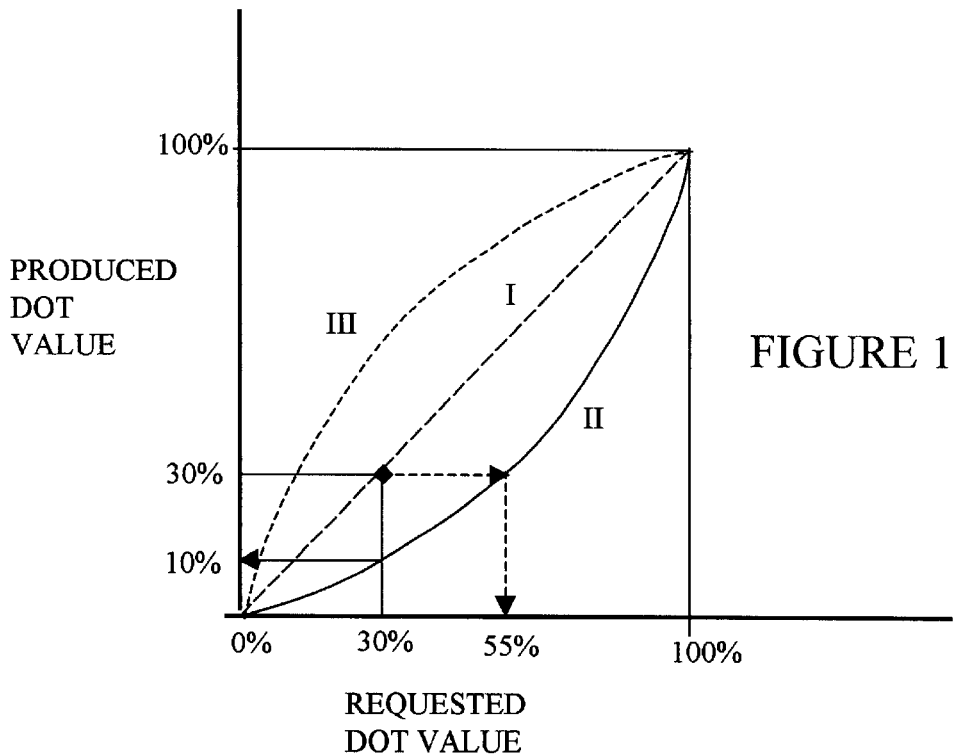
FIG. 1 shows three curves representing halftone values produced on an imaging medium with an imaging apparatus as a function of requested input halftone values.

Referring first to FIG. 1 there is shown a number of curves representing the result of reproducing different requested gray scale values on an imaging medium using an imaging device such as an imagesetter. Curve I shows an ideal situation where the gray scale value produced is the same as the requested gray scale value. Thus a requested 30% gray value having 30% dots is reproduced as a 30% gray value with 30% dots. Unfortunately for the reasons discussed earlier the combination of a number of factors in the reproduction process results in a different situation. Curve II represents this case and this curve is often referred to as the natural response of the device when used with a particular imaging medium for a particular screen frequency.

As seen in this figure requested or input values to the device do not reproduce the same values on the imaging medium. Where for instance the input value calls for a gray scale corresponding to 30% area coverage, i.e. a 30% dot, the result as measured on the imaging medium corresponds to an area coverage of 10%. Curve III represents a correction factor that must be applied to the input values to produce an output that accurately corresponds to the input.

In the current description we will often refer to an imagesetter as the imaging device. Such reference to a particular device is not to be construed as limiting the invention to application to image-setters only. Any imaging device capable of accepting input density values representing gray scales to reproduced by halftones on an imaging medium is also included. In addition the halftone process referred to in this description is an AM halftone.

Image-setters are well known exposure devices that use a scanning laser beam to expose an imaging medium to a plurality of minute dots known as pixels. The laser beam is scanned along raster lines and turned on and off to produce individually exposed pixels.

An aggregation of pixels is used to paint a halftone dot and an aggregation of different size dots are used to produce an area having a desired gray scale value such value dependent on the percentage of the area covered by the dots. The dots are arrayed along a ruling which is another way to identify the pitch between centerlines of adjacent dots.

Figure 2:
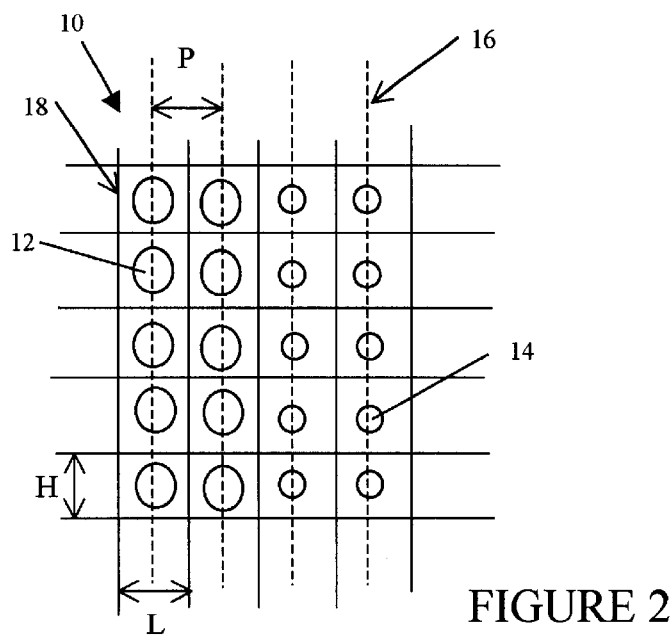
FIG. 2 is a schematic representation of two sets of two different size dots representing two different halftone values arrayed according to a screen ruling.

FIG. 2 shows a plurality of dots 10. Two different dot sizes are shown, 12 and 4. The dots have their centers regularly spaced along a ruling 16 with a pitch "P". The maximum area each dot may cover is limited by the four sides defined by lines 18 drawn halfway between each dot center. This in the case where the screen is a 90 degree ruling the maximum dot size area is a rectangle having height "H" and width "L". This area is referred to in this description as the unit area cell, and is useful in calculating gray scale values.

Figure 3:
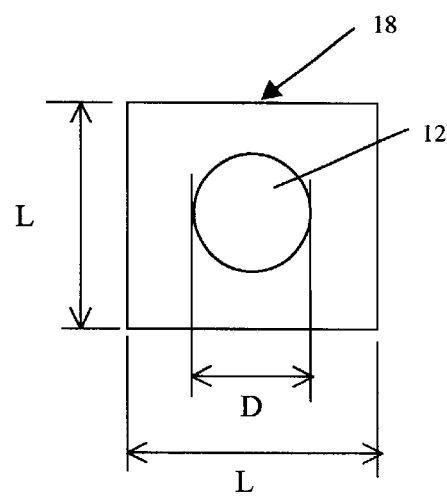
FIG. 3 shows an enlarged unit area cell containing a dot used to calculate the relative cell area covered by a dot having a specified halftone value.

FIG. 3 shows a single unit area cell 18 having a dot 12. In this illustration the dot is circular having a diameter "D", and the unit area cell is square having a side "L". The dot area is $A_d = \pi D^2/4$ and the unit area cell area is $A_c = L^2$. The gray scale % value is $(A_d/A_c)*100$, and typically comprises a plurality of dots having the same diameter. Therefore the term dot size as a % designates the relative size of the dot in its unit area and is the same in value as the corresponding gray scale value when such is given as a % number between 0% for white and 100% for black. That is a gray scale value of 50% contains dots whose area equals one half the area of a unit area cell.

As mentioned earlier the natural response of the image setter must be known for all different imaging media used and for all different screen frequencies and angles as it has been found that percentage dot area coverage with same size dots is different for different screens and angles. Therefore a number of calibration curves must be developed for each such case.

A requirement of this invention is the determination of a dot diameter for a given gray scale area. This may be done by measuring a dot diameter in the desired area under a measuring microscope and obtaining a direct measurement of the dot diameter. Alternatively, since the development of the Murray-Davis-Yule equation in 1941, the relation between dot area coverage and density measurement has been well known. Dot diameter calculations based on the Murray-Davis-Yule equations giving dot area for a given density reading, assume a round dot shape, a situation which is not always exactly true. Particularly dots reproduced using a scanning laser beam to expose a plurality of pixels to form a dot do not form perfectly exposed round dots. Further more depending on the programming of the exposure source and unit, the dot may be more square than round. In such case it may be more appropriate to talk in terms of "side" rather than "diameter".

While we are using the term "dot diameter", this term as used in this invention also designates the largest linear dimension in cases where dots are not circles. Similarly in the examples given the dot area is calculated on the basis of a circular dot. When the dot shape is different, area should be calculated for the actual dot shape. Thus in case of a square dot shape, area is $side^2$ and diameter equals the square side.

Both direct measurement or derivation from density readings have advantages and disadvantages. Because dots may be reproduced with irregular shapes or jagged edges rather than perfect shapes at times it is preferred that dot diameters be calculated using density readings and converting them to dot area from which an equivalent dot diameter may be derived rather than actually trying to measure the dot diameter under a microscope. On the other hand when clear, well shaped dots are available a direct measurement may be advantageous. In any case the dot diameter measurement in the printing arts is well known and for purposes of the present invention it is not important how dot diameters are measured.

According to the present invention, a small number of measurements at a single screen frequency is used to derive all data necessary to calibrate any halftone image reproduction system and imaging medium for all screen frequencies. This number may be as low as two and preferably is three or four.

The first step in the present process requires selecting a test target. Such target has a number of gray scale areas with different values. Such number must be at least two and preferably three or four. Such a test target having four different areas will be used as an example to illustrate the calibration process according to the present invention. Thus the requested gray scale areas are:

5.5%, 10.2%, 40% and 70.2%.

The corresponding dot diameters for dots in a 120 lines per inch ruling are in microns:

$D_r$=56, 76.2, 151, and 200.

These values are sent to an imagesetter as digital values 14, 26, 102, and 179.

Following exposure of an imaging medium with image setter and development, the reproduced gray scale areas are measured again:

2.0%, 5.7%, 32.0, and 61.8%.

The corresponding dot diameters are again in microns:

$D_m$ 33.8, 57, 135.1, and 187.7.

The change in dot diameter for each test area is in microns:

$\Delta D_m$=−22,−19.2,−15.9, and −12.3.

Figure 4:
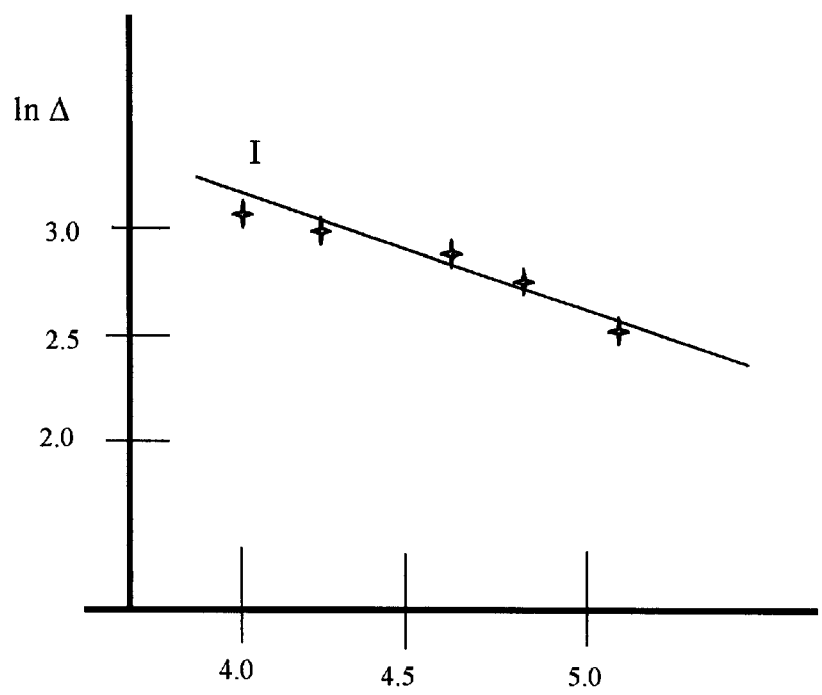
FIG. 4 shows the derived first function used to calibrate an imaging device in accordance with the present invention.

The change in dot diameter as a function of requested dot diameter is preferably plotted using the ln of $\Delta D_m$ as a function of $D_r$, as shown in FIG. 4. Using, preferably linear regression a curve I representing a best fit is drawn through the points representing a first function. Such function may be in the form of an algorithm or a plotted curve and may be stored as a LUT or as a formula, $\Delta D_m = f(D_r)$.

From this first function a plurality of calibration curves is derived. First a calibration curve for the same ruling as used up to this point is derived as follows.

Assume for this illustration that the requested gray scale value at a particular point is 7%. The diameter of such dots in a 120 lpi ruling is 65 microns. The ln of 65 is 4.17. using the function $\Delta D_m = f(D_r)$, we predict a reproduced dot diameter change $\ln(\Delta D_m) = 3.01$ and a predicted change in the diameter of −20.1 microns. (absolute values are used in the ln calculations). The predicted dot diameter is $D_p = D_r + (-20.5) = 65 - 20.5 = 44.9$ microns.

The dot area is $A_p = 3.14 \ast (44.9)^2 / 4 = 1583$ microns$^2$.

The unit cell area for a unit cell in a 120 lpi ruling is 44,804 microns$^2$. Thus the dot area divided by the cell area yields a predicted 3.5% dot output when a 7% dot is requested. This calculation may be used to derive a calibration curve using as many points as will produce a smooth curve. It can also be used to generate a LUT with a complete listing of all % values by single % increments for determining what the output will be for any one of a requested input. This calibration curve may then be used to alter the value of the requested gray scale value to a new, corrected value that will produce gray scale value on the imaging medium equal to the requested value.

Once $\ln \Delta D_m = f(\ln(D_r))$ is derived for one screen ruling it can be used to derive calibration curves for other rulings as well. The procedure for calculating the predicted dot change is the same for the predicted dot diameter change and corresponding predicted dot area. However the % dot area coverage of the predicted dot area is next calculated once more for the cell corresponding to the new ruling.

Figure 5:
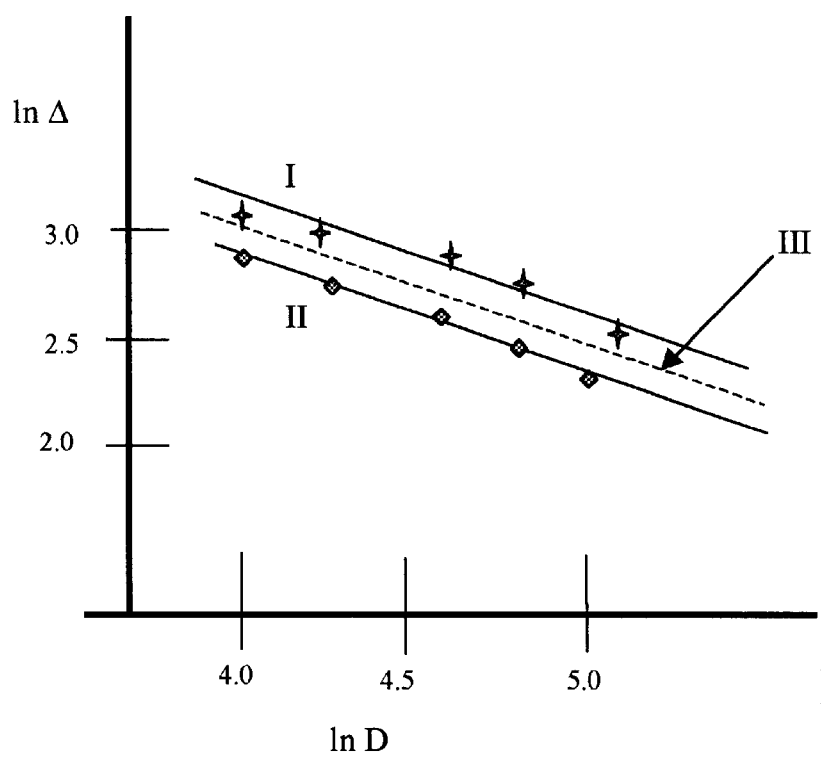
FIG. 5 shows two derived first functions used to calibrate an imaging device in accordance with an alternate embodiment of the present invention.

In certain instances, particularly cases where the exposed material is a photopolymer which may be sensitive to oxygen diffusion effects that may effect the sensitivity of the material as the screen rulings become spaced closer together, it is advantageous to obtain two functions of $\Delta D_m = f(D_r)$, one for a ruling at the low end of the scale, i.e. 50 lpi, and one for the high end, i.e. 200 lpi. This produces two curves, I and II shown in FIG. 5 each of which may be used to derive predicted diameter changes for the two different screen rulings. Once the two limit curves have been derived predicted diameter changes for rulings between the two are derived by extrapolation between the two experimentally obtained curves.

Implementation of this process is best done with the aid of software for use in a computer. Attachment 1 shows the basic mode for implementing the above described process through software and covers the three possible dot conditions, (a) requested dot diameter much smaller than unit area cell maximum dimension, (b) requested dot diameter same as maximum cell dimension and (c) requested dot diameter larger than maximum cell dimension. These conditions are important in calculating the predicted dot area relative to the unit cell area since growth of the dot outside the confines of the unit cell do not contribute to the calculation of the % dot area coverage or gray scale value.

Having described my invention in terms of certain specific equipment and process steps including specific equations and ways to calculate certain values it will become apparent that other similar ways to achieve the calibration of image reproducing systems using the linear change in the dots forming the different values of the gray scale in a halftone system may be employed.

Such variations are to be considered within the scope of my invention in which I claim:

1. A method for deriving a calibration curve for a halftone imaging apparatus comprising:
   A) requesting said imaging apparatus to produce on an imaging medium at a first screen ruling a requested halftone dot test pattern comprising at least two different requested halftone gray values, each halftone gray value comprising dots having a requested dot diameter and a requested dot area, said gray value representing the portion of a unit cell area covered by the dot area;
   B) producing with said imaging apparatus on said imaging medium a imaged test pattern corresponding to said requested test pattern;
   C) measuring said imaged test pattern dot areas and calculating an imaged dot diameter for each of said distinct imaged dot areas in said imaged test pattern;
   D) calculating a dot diameter change as a difference between said requested dot diameter and said imaged dot diameter for each of said different halftone gray values of said requested and second test pattern;
   E) deriving a first function representing said calculated dot diameter change as a function of requested dot diameter;
   F) using said first function, to predict a predicted dot diameter change for any requested dot diameter;
   G) using said predicted dot diameter, calculating a predicted dot area and a predicted dot value representing the proportion of the area of any unit cell covered by the predicted dot area;
   H) using a plurality of such predicted dot values as a function of requested dot values to derive a calibration curve for a halftone imaging apparatus.

2. The method according to claim 1 wherein in step (F) the first function is used to predict a predicted dot diameter change for any requested dot diameter for a plurality of different screen ruling, and in steps (G) and (H) the plurality of predicted dot values as a function of requested dot values is used to derive a plurality of calibration curves corresponding to a plurality of screen rulings for a halftone imaging apparatus.

3. The method according to claim 1 wherein said calibration curve is stored in a memory as a Look-Up-Table.

4. The method according to claim 1 wherein the predicted and requested dot values are given as a % of said cell area.

5. The method according to claim 1 wherein the predicted and requested dot values are given as a digital value representing said % value of said cell area.

6. The method according to claim 1 wherein said first function representing said calculated dot diameter change as a function of requested dot diameter is derived from the logarithm of said diameter change as a function of the logarithm of said original dot diameter.

7. The method according to claim 6 wherein said logarithms are natural logarithms.

8. The method according to claim 6 wherein the first function is derived by linear regression from a plurality of points representing a natural logarithm of the change in dot diameter as a function of a natural logarithm of the original dot diameter.

9. The method according to claim 1 wherein in calculating said predicted dot area the dot is assumed to be circular and the unit cell area square.

10. The method according to claim 1 wherein said test target includes two sets of at least two distinct dot values, each set representing dot values at a different screen ruling, and wherein two first functions are derived, one for each of said set of dot values and screen ruling, and wherein the step of calculating the predicted dot diameter change further includes the step of deriving by extrapolation from said two first functions an extrapolated first function corresponding to a desired screen ruling, and using said extrapolated first function in place of said first function.

11. A method for correcting original halftone dot values sent to an imaging apparatus for accurate reproduction on an output medium, the method comprising:

A) requesting said imaging apparatus to produce on an imaging medium at a first screen ruling a requested halftone dot test pattern comprising at least two different requested halftone dot values, each halftone dot having a dot diameter and a dot area, said dot value representing the portion of a unit cell area covered by the dot area;

B) producing with said imaging apparatus on said imaging medium an imaged test pattern of said requested test pattern;

C) measuring said imaged test pattern dot areas and calculating an imaged dot diameter for each of said distinct imaged dot areas in said imaged test pattern;

D) calculating a dot diameter change as a difference between said requested dot diameter and said imaged dot diameter for each of said distinct test pattern halftone dot areas;

E) deriving a first function representing said calculated dot diameter change as a function of requested dot diameter;

F) using said first function, predicting a dot diameter change for any requested dot diameter size requested from and generated on the output medium with said imaging apparatus;

G) using said predicted dot diameter change, calculating a predicted dot area and a predicted dot value representing the proportion of the area of a unit cell covered by the predicted dot area;

H) using a plurality of such predicted relative dot area values as a function of requested dot values to obtain a function predicting for any requested value a corresponding output dot value for a dot produced by said imaging apparatus on said imaging medium and I) using said function to alter any original dot value sent to said imaging equipment to produce an output value substantially equal to said original value on said imaging medium.

12. The method according to claim 11 wherein in step (F) the first function is used to predict a predicted dot diameter change for any requested dot diameter for a plurality of different screen ruling, and in steps (G) and (H) the plurality of predicted dot values as a function of requested dot values is used to derive a plurality of calibration curves corresponding to a plurality of screen rulings for a halftone imaging apparatus.

13. The method according to claim 11 wherein said calibration curve is stored in a memory as a Look-Up-Table.

14. The method according to claim 11 wherein the predicted and requested dot values are given as a % of said cell area.

15. The method according to claim 11 wherein the predicted and requested dot values are given as a digital value representing said % value of said cell area.

16. The method according to claim 11 wherein said first function representing said calculated dot diameter change as a function of requested dot diameter is derived from the logarithm of said diameter change as a function of the logarithm of said original dot diameter.

17. The method according to claim 16 wherein said logarithms are natural logarithms.

18. The method according to claim 16 wherein the first function is derived by linear regression from a plurality of points representing a natural logarithm of the change in dot diameter as a function of a natural logarithm of the original dot diameter.

19. The method according to claim 11 wherein in calculating said predicted dot area the dot is assumed to be circular and the unit cell area square.

20. The method according to claim 11 wherein said test target includes two sets of at least two distinct dot values, each set representing dot values at a different screen ruling, and wherein two first functions are derived, one for each of said set of dot values and screen ruling, and wherein the step of calculating the predicted dot diameter change further includes the step of deriving by extrapolation from said two first functions an extrapolated first function corresponding to a desired screen ruling, and using said extrapolated first function in place of said first function.

* * * * *